United States Patent [19]

Chadwick et al.

[11] Patent Number: 4,791,543

[45] Date of Patent: Dec. 13, 1988

[54] HIGH POWER SWITCHED POWER SUPPLY

[75] Inventors: P. N. R. Chadwick, Petzenhausen; Horst Morgott, Diedorf, both of Fed. Rep. of Germany

[73] Assignee: Siemens Aktiengesellschaft, Berlin and Munich, Fed. Rep. of Germany

[21] Appl. No.: 168,592

[22] Filed: Mar. 3, 1988

Related U.S. Application Data

[63] Continuation of Ser. No. 012,340, Feb. 9, 1987, abandoned.

[30] Foreign Application Priority Data

Feb. 28, 1986 [DE] Fed. Rep. of Germany ....... 3606592

[51] Int. Cl.[4] ............................................ H02M 1/12

[52] U.S. Cl. ...................................... 363/48; 363/56; 336/175; 336/223

[58] Field of Search .................. 63/25, 46, 47, 48, 56, 63/126; 336/174, 175, 223

[56] References Cited

U.S. PATENT DOCUMENTS

| | | | |
|---|---|---|---|
| 3,340,458 | 9/1967 | Keller | 363/48 |
| 3,611,233 | 10/1971 | Haldeman, Jr. | 336/223 X |
| 3,916,286 | 10/1975 | Waehner | 363/25 |
| 4,586,120 | 4/1986 | Malik et al. | 363/56 X |

FOREIGN PATENT DOCUMENTS

| | | | |
|---|---|---|---|
| 0486189 | 11/1929 | Fed. Rep. of Germany | 336/175 |
| 1422994 | 12/1966 | France | 363/48 |
| 0982163 | 12/1982 | U.S.S.R. | 363/48 |

*Primary Examiner*—Patrick R. Salce
*Assistant Examiner*—Kristine Peckman
*Attorney, Agent, or Firm*—Hill, Van Santen, Steadman & Simpson

[57] ABSTRACT

A filter circuit is provided in the secondary of a power transformer following a rectifier and is composed of two chokes respectively arranged in the series arms of the lines leading to two output terminals, and at least one shunt capacitor. Each of the chokes is composed of a winding fashioned as a strip-shaped interconnect, whereby both windings are conducted through a common magnetic core in the same winding sense.

1 Claim, 1 Drawing Sheet

HIGH POWER SWITCHED POWER SUPPLY

This is a continuation of application Ser. No. 012,340, filed Feb. 9, 1987, now abandoned.

BACKGROUND OF THE INVENTION

1. Field of the Invention

The present invention relates to a high-power switched power supply comprising a power transformer whose primary is composed of a power rectifier and of a switched element, a filter circuit being provided in the secondary circuit of the transformer following a rectifier, the filter circuit comprising two chokes respectively arranged in a series arm in the lines leading to two output terminals of at least one shunt capacitor.

2. Description of the Prior Art

Switched power supplies have the significant advantage over traditional power supplies in that they have a high efficiency given low weight and low volume and given a correspondingly lower expense. In contrast thereto, disadvantages are a somewhat more complicated circuitry, a greater radio frequency (RF) noise emission and greater difficulties in smoothing the output voltage.

Greater RF disturbances particularly occur given switched power supplies that comprise a filter choke in only one of the lines leading to the two output terminals, with the result that the RF disturbances proceed to the load by way of the other choke-free line. The integration of additional RF chokes into the two output lines, if need be in combination with Y-anti-interference capacitors, is in fact fundamentally possible, but causes a considerable expense in high-power devices because such RF chokes are very expensive because of their size.

The foregoing is also true for the case in which a power choke is interposed in each of the two output lines because the second power choke necessarily requires additional space and correspondingly added expense. As an additional complicating factor, given high-power switched power supplies, is that power chokes can practically not be "wound" because of the large line cross section.

SUMMARY OF THE INVENTION

The object of the present invention is to provide, as optimally as possible, a solution for the improvement of the smoothing and RF noise suppression in high-power circuits in view of the necessary space and material requirement.

The above object is achieved, according to the present invention, in a circuit which is particularly characterized in that the two chokes are each composed of a winding constructed as a strip-shaped interconnection, and in that both windings are fed through a common magnetic core in the same winding sense. The arrangement of the present invention corresponds to a choke having two windings without the winding material having its large cross section corresponding to the high current intensities having to be wound. The good anti-interference properties of the filter circuit, due to the symmetrical structure, are a further advantage.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
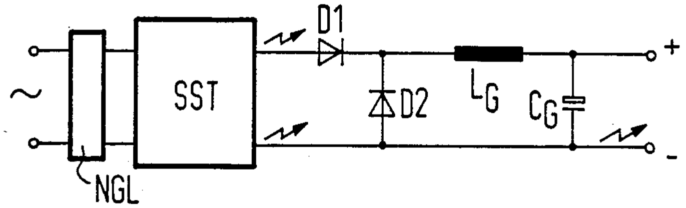
FIG 1 (PRIOR ART)
FIG. 1 is a basic circuit diagram of a switched power supply comprising an LC filter element provided in the output circuit.

At the input side, the fundamental circuit diagram of a switched power supply is illustrated in FIG. 1 and shows a power rectifier NGL having a following switch element SST which generates a square wave voltage from the d.c. voltage by chopping and converts the same with the assistance of a transformer. Following at the secondary side of the transformer, which achieves power isolation at the same time, is a rectification with the assistance of two rectifiers D1, D2 and, following thereupon, a filter. The filter circuit is composed of a smoothing choke $L_G$ inserted along the one output line and a smoothing capacitor $C_G$ connected in a shunt arm with respect to the load. Such a filter circuit has the disadvantage that the RF noise emission caused by the switch SST and symbolized by lightning symbols is adequately reduced only in the choke arm. In the second output line leading to the negative pole, which does not contain a smoothing choke, the RF noise emission, in particular, proceeds unimpeded to the output.

Figure 2:
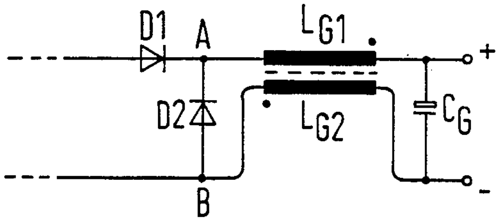
FIG. 2 is a schematic illustration of a filter circuit of the present invention comprising two filter chokes.

The filter circuit of FIG. 2 counters the foregoing difficulties in an advantageous manner in that a respective smoothing choke $L_{G1}$, $L_{G2}$ is contained in each of the two output lines and that the two chokes are arranged on a common coil core.

Figure 3:
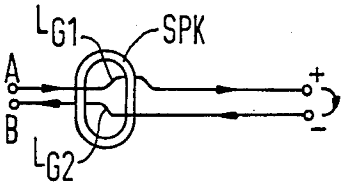
FIGS. 3 and 4 are respectively basic structures of a filter choke arrangement of the type illustrated in FIG. 2.
Figure 4:
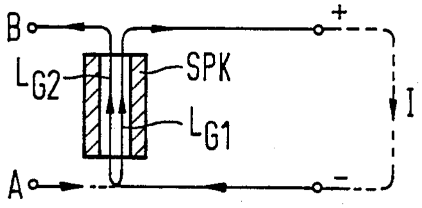

As the coil structure shown in FIGS. 3 and 4 illustrates, the two chokes $L_{G1}$, $L_{G2}$ are each composed of one winding and, in addition, both windings are conducted through the coil core SPK in the same winding sense. This means that the currents I respectively flowing through the coil core SPK from the point A to the positive pole or, respectively, from the negative pole to the point B are additive.

Figure 5:
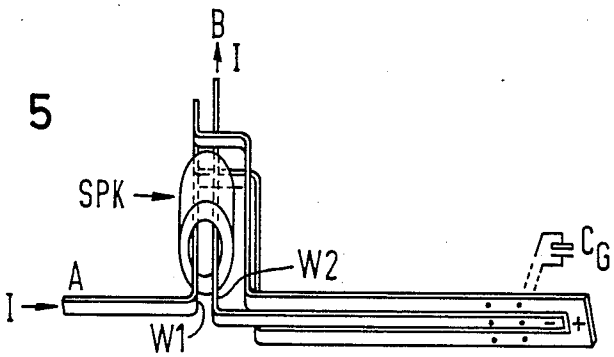
FIG. 5 is a schematic representation of an advantageous realization of a filter choke arrangement according to FIGS. 3 and 4.

A structure for the filter chokes of FIGS. 3 and 4 which is particularly advantageous for high-power switched power supplies is illustrated in FIG. 5. FIG. 5 illustrates a perspective view of an interconnect in the form of a copper band assigned to the choke $L_{G1}$. The copper band is subdivided into three sub-paths connected together at one end, the middle sub-path thereof being conducted through the bore of a tubular coil core SPK as a first winding W1, whereas the two outer sub-paths are returned at the exterior of the core. These two outer sub-paths are extended beyond the core and have their extended ends, which are bent off at a right angle relative to the core axis, connected to one of the two output terminals, here to the positive terminal. The start of the center sub-path is likewise bent off at a right angle relative to the core axis, in particular preferably in a direction opposite that of the two outer sub-paths.

The interconnect assigned to the other choke $L_{G2}$ is likewise a copper band and, proceeding from the second output terminal, first proceeds between the two outer sub-paths of the choke $L_{G1}$ and, as a second winding W2, subsequently extends through the coil core SPK. The bent off ends of the two outer sub-paths of the choke $L_{G1}$ and the interconnect of the choke $L_{G2}$ lying therebetween advantageously serve as mounting surfaces for one or more smoothing capacitors $C_G$ connected in parallel thereto.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a switched power supply of the type having first and second output terminals, a transformer circuit including a switch element feeding a rectifier circuit followed by a filter circuit, and in which first and second chokes are respectively connected between said rectifier circuit and said first and second output terminals, the improvement wherein said filter circuit comprises:

a capacitor connected across said output terminals;

a common magnetic core, each of said chokes comprising a strip-shaped winding extending through said core with the strip-shaped winding traversing said core in the same winding sense;

said first choke comprising three sub-paths including two outer sub-paths external of said core and connected to said first output terminal and a central sub-path extending through said core;

said second choke comprising a strip-shaped band extending through said core and between said outer sub-paths of said first choke; and said outer sub-paths and said strip-shaped band include ends constituting said output terminals and mounting said capacitor.

* * * * *